Figure 1:
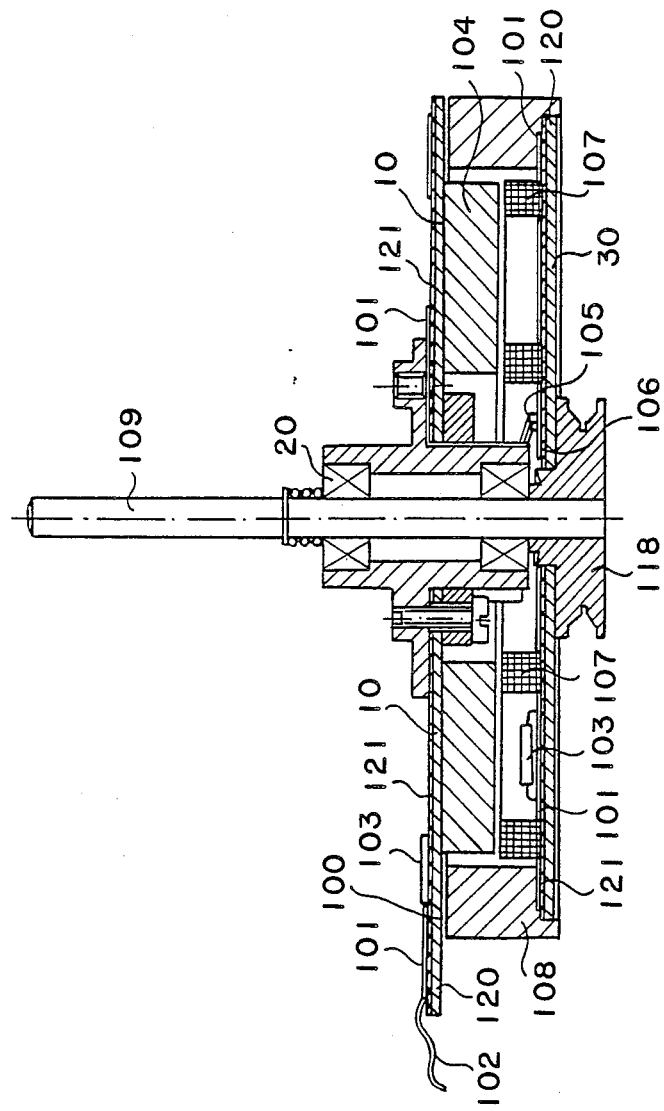

United States Patent [19] [11] Patent Number: 4,982,130
Cap et al. [45] Date of Patent: Jan. 1, 1991

[54] ELECTRIC MOTOR WITH A STATOR AND A ROTOR MADE FROM LAMINATED LAYERS OF PLATES

[75] Inventors: Heinrich Cap, Peterzell; Edgar Zuckschwert, St. Georgen, both of Fed. Rep. of Germany

[73] Assignee: Papst-Motoren GmbH & Co. K.G., St. Georgen, Fed. Rep. of Germany

[21] Appl. No.: 273,143

[22] Filed: Nov. 16, 1988

Related U.S. Application Data

[63] Continuation of Ser. No. 53,138, May 21, 1987, abandoned.

[30] Foreign Application Priority Data

May 21, 1986 [DE] Fed. Rep. of Germany ....... 3617018

[51] Int. Cl.[5] ............................................. H02K 1/22
[52] U.S. Cl. ...................................... 310/268; 310/42; 310/45; 310/68 R; 310/72; 310/154; 310/237
[58] Field of Search ..................... 310/42, 72, 154, 254, 310/261, 165, 208, 268, 237, DIG. 6, 198, 156, 68 R; 428/209, 201; 361/397, 400; 427/97

[56] References Cited

U.S. PATENT DOCUMENTS

| | | |
|---|---|---|
| 4,004,057 | 1/1977 | Hoffman ............................. 428/209 |
| 4,079,277 | 3/1978 | Osanai . |
| 4,086,510 | 4/1978 | Watanabe . |
| 4,093,882 | 6/1978 | Furuta . |
| 4,143,288 | 3/1979 | Sato . |
| 4,203,048 | 5/1980 | Sato . |
| 4,268,585 | 5/1981 | Daur .................................... 428/209 |
| 4,374,336 | 2/1983 | Shimizu . |
| 4,384,223 | 5/1983 | Zelt ...................................... 310/72 |
| 4,517,480 | 5/1985 | Muller ................................. 310/268 |
| 4,568,847 | 2/1986 | Schmider ......................... 310/68 R |
| 4,594,524 | 6/1986 | Sudo .................................... 310/268 |
| 4,633,110 | 12/1986 | Genco ............................. 310/68 R |
| 4,661,733 | 4/1987 | Heyraud ............................... 310/268 |
| 4,701,655 | 10/1987 | Schmider ...................... 310/DIG. 6 |

FOREIGN PATENT DOCUMENTS

| | | |
|---|---|---|
| 0219553 | 3/1961 | Austria ......................... 310/DIG. 6 |
| 3427994 | 1/1986 | Fed. Rep. of Germany . |
| 2171854 | 6/1987 | United Kingdom . |

Primary Examiner—R. Skudy
Attorney, Agent, or Firm—Fitch, Even, Tabin & Flannery

[57] ABSTRACT

An electric motor includes a stator and a rotor and a bearing that connects both in a rotatable manner. The rotor and stator include electric conductor paths leading to exciting coils and/or to electronic components, all arranged on an iron-plate serving as a magnetic return path. The iron-plate has at least one electrical insulating layer that serves to insulate it, as well as at least the conductive layer forming the conductor paths which are on the insulating layer.

12 Claims, 3 Drawing Sheets

ELECTRIC MOTOR WITH A STATOR AND A ROTOR MADE FROM LAMINATED LAYERS OF PLATES

This application is a continuation of application Ser. No. 051,138 filed May 21, 1987 now abandoned.

The invention relates to an electric motor with a stator and a rotor made from a composite of laminated layers of plates and with a bearing that connects both such motor elements in a rotatable manner.

In capstan-driving mechanisms with commutators, as, for example, those utilized in tape-drives, it often is desirable to strive for a very shallow construction. In this type of application it also is often necessary to produce very large quantities of pieces, and there arises the problem of how to satisfy the demand for both shallow construction and for a reduction of manufacturing costs.

One arrangement, known from DE-OS 3427994.6 [i e., German-Austrian patent], is already concerned with the use of stamped circuit-boards, which are fashioned as composites of plates in layers. The structure of that patent can still be further improved.

The solution is achieved by causing the motor elements to provide conductor paths which lead to the exciting coils and/or to the electronic components. The electric conductor paths are arranged on an iron-plate serving as a magnetic return path. The iron-plate has at least one electrical insulating layer that serves to insulate it, as well as at least a conductive layer forming the conductor paths which are situated on the insulating layer.

With this arrangement it is possible to manufacture both of the complementary motor parts, namely the stator and the rotor, each being of one-piece construction and being made from one piece of material, that is to say from the insulation-coated iron plate. All required connecting paths can be provided by means of etching a copper lining or by screen-printing of metallic or other conductive facings.

Great simplification is thereby achieved in the manufacture of the individual parts. Further, there is a decrease in the total number of parts, a simultaneous enhancement of the sturdiness of the individual parts, and a simplification of assembly, all resulting in an appreciable advantage from the standpoint of industrial technology.

The coils can be manufactured helically as so-called "sheet-coils" from the copper lining or by means of a screen-printing process. This also can be effected in a multi-layered form.

If the motor has a commutator, this commutator can be part of the conductive layer. If need be, the conductive layer can have greater material thickness, to the extent of approximately 100 microns to 150 microns, and be coated with noble metals. This will result in increased service life.

Likewise, electronic components necessary for the motor, such as interference-suppressors and devices for adjustment and control, can be arranged on and interconnected into either the rotor or the plate that forms the stator.

The arrangement can have more than one rotor and a common stator.

If necessary, electronic components, such as resistances and condensers, which serve as interference-suppressors and as devices for control or adjustment, can be either introduced individually into the conductor pathways or be incorporated between the conductor pathways by means of screen-printing.

Figure 2:
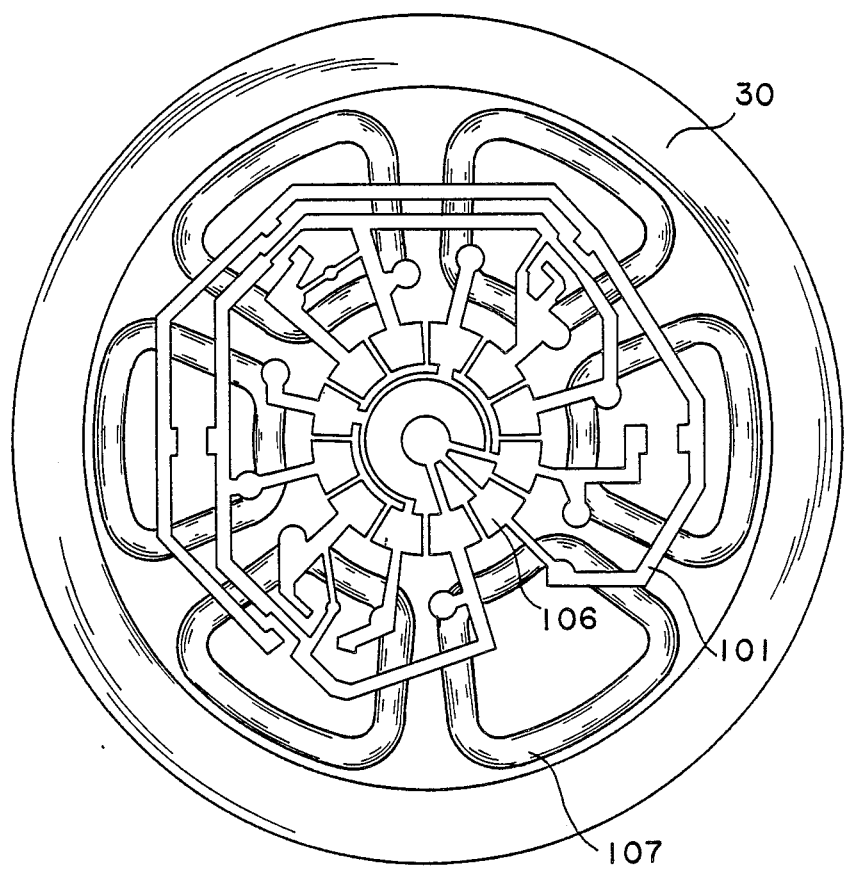
Figure 3:
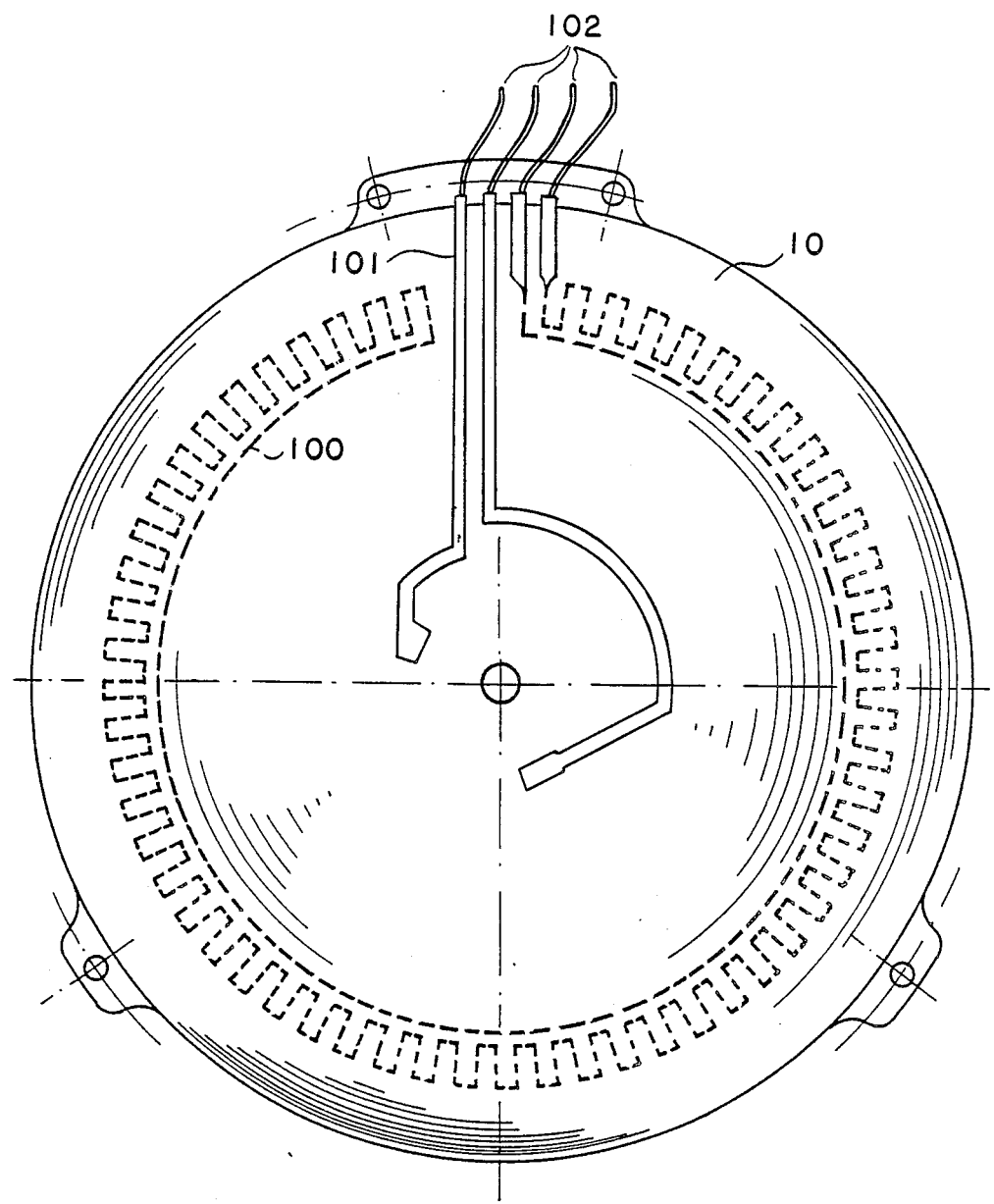

The series of drawings, with the aid of which the invention is described, are:

FIG. 1 an axial section through a motor constructed in accordance with the invention;

FIG. 2 is a rotor with coil-windings, printed circuitry and a commutator from the motor of FIG. 1; and FIG. 3 is a stator with components and printed circuitry from the motor of FIG. 1.

In FIG. 1, a stator 10 includes a composite lamination of magnetically active soft iron plate 120, at least one insulating layer 121 and conductor paths 101. A pair of bearings 20 is used to mount a rotor 30 rotably with respect to the stator 10. The rotor also includes, to good advantage, composite lamination that is equivalent in its composition to, for example, the combination 120-121-101 which iron plate 120 has been copper-lined and etched, or of such a plate which has been provided with conductor paths by means of screen printing. Permanent magnets 104 and the plate 120 acting as a magnetic return path are preferably affixed to the stator 10.

The conductive layers of the rotor 30 (FIG. 2) and, if need be, the commonutator 106 and the electric conductor path 101 to exciting coils 107, are produced by means of known etching and screen-printing processes. Electronic components that have been produced by screen-printing, such as resistences and condensers, can, moreover, be incorporated into the circuitry.

In the event that a flat commutator is utilized, it is advantageous that this also be produced by means of etching or screen-printing. Therefore, the conductive paths are executed with greater thickness. Thus, for example, a thickened copper lining is utilized, or the thickness of the coating is increased in the screen-printing stage. Thicknesses of the conductive layer, measuring approximately 70 microns to 150 microns, are appropriate in this regard.

In particular, the commutator segments that are produced in this way can additionally be provided with noble-metal coatings of gold, nickel or palladium, all of which lengthens the service life of the commutator.

On the stator 10 (FIG. 3), two external connection lines 102 are connected to the conductor paths 101 which have been produced in the same way and which likewise connect into a complete circuit such electronic components 103 that may possibly serve for adjustments, controls or interference-suppression. The other two lines 102 are connected to a tachometer winding 100 that generates a signal from the rotation of a permanent magnet ring 108 below (FIG. 1). The permanent magnet ring 108 has many poles (not shown) to correspond to the "square wave" pattern of the winding 100.

The current supply to the rotor 30 is effected by way of brushes 105, which can be soldered directly onto the conductor paths 101 of the stator 10.

The mechanical movement can be transferred by way of the shaft 109 or a pulley 118.

In place of the windings from the wire-coils, it is also possible to utilize those helical coils which are described as "sheet coils". The helics are likewise in the nature of conductor paths, which are produced on the insulation-coated iron-plate in the course of the same manufacturing process, that is to say by etching or by screen-printing, just as are the segments of the commutator 106 or the other conductor paths 101.

With the use of additional insulating layers and additional helical coils, a multi-layered development of the sheet-coils of prior art can be made possible by connecting the ends of the windings.

We claim:

1. Electric motor having a stator and a rotor both of which include a composite of planar layers of plates, a bearing that connects both in a rotatable manner, and electronic components on the stator and rotor forming various circuits of the motor, the stator having at least one permanent magnet attached thereto and the rotor having at least one exciting coil attached thereto, comprising: a soft iron plate being included in the planar layers of each of the stator and the rotor, the soft iron plate on the stator being a base support for the permanent magnet and electronic components, a magnetic return circuit and a base for electrically conductive paths, and the soft iron plate on the rotor being a base support for the exciting coil and electronic components and a base for electrically conductive paths; a layer of a plurality of electric conductor paths applied on the iron plate and leading to the exciting coil and/or to the electronic components; and at least one electrically insulating layer lying intermediate the layer of conductive paths and the iron plate.

2. A motor according to claim 1, wherein the exciting coil is fashioned in the manner of helical sheet coils and is part of the layer which forms the conductor paths.

3. A motor according to claim 1 or 2, wherein the electronic components include interference suppressors and devices for adjustment control and are arranged and interconnected on the soft iron plate of either the stator or the rotor.

4. A motor according to claim 3, wherein the electronic components are produced on the soft iron plate by means of screen-printing.

5. A motor accoring to claim 3, wherein the motor contains a commutator with segments in particular a flat commutator, which is part of the layer forming the conductor paths, and wherein the conductive layer has a thickness range of between approximately 70 microns to approximately 150 microns.

6. A motor according to claim 5, wherein the commutator segments include a thin coating of a noble metal, such as gold, nickel or palladium.

7. Permanent magnetically actuated electric motor having a stator and a rotor both of which are made from a composite of planar layers of plates, a bearing that connects both in a rotatable manner, and electronic components on the stator and rotor forming various circuits of the motor, the stator having at least on permanent magnet attached thereto and the rotor having at least one exciting coil and a planar commutator with segments attached thereto, comprising:

a soft iron plate being included in the planar layers of each of the stator and rotor, the soft iron plate on the stator being a base support for the permanent magnet and electronic components, a magnetic return circuit and a base for electrically conductive paths, and the soft iron plate on the rotor being a base support for the exciting coil and electronic components, a magnetic return circuit and a base for electrically conductive paths;

a conductive layer of a plurality of electric conductor paths applied on the iron plate of both the rotor and the stator and leading to the exciting coil and to the electronic components and to the commutator and to the electronic components, respectively;

and at least one electrically insulating layer lying intermediate each layer of conductive paths and the respective iron plate;

the iron plate serving as a magnetic return circuit on the rotor rotating therewith.

8. Electric motor of the flat air gap type having a permanent magnet stator and a rotor both of which include a composite of planar layers of plates, a bearing that connects both in a rotatable manner, and electronic components on the stator and rotor forming various circuits of the motor, the stator having at least one permanent magnet attached thereto and the rotor including at least one exciting coil and a commutator with segments, comprising:

a soft iron plate being included in the planar layers of each of the stator and the rotor, the soft iron plate on the stator being a base support for the permanent magnet and electronic components, a magnetic return circuit and a base for electrically conductive paths, and the soft iron plate on the rotor being a base support for the exciting coil and electronic components, a magnetic return circuit and a base for electrically conductive paths;

a conductive layer of a plurality of electronic conductor paths applied on the iron plate of both the rotor and the stator and leading to the exciting coil and to the electronic components and to the commutator and to the electronic components, respectively, the conductive layer including the segments of the commutator;

and at least one electrically insulating layer lying intermediate each layer of conductive paths and the respective iron plate.

9. A motor according to claim 7 or 8, wherein the exciting coil is part of the layer which forms the conductor paths.

10. A motor according to claim 7 or 8, wherein the electronic components include interference suppressors and devices for adjustment and control and are arranged and interconnected on the soft iron plate of the rotor.

11. A motor according to claim 7 or 8, wherein the conductive layer has a thickness range of between approximately 70 microns to approximately 150 microns.

12. A motor according to claim 11 wherein the commutator segments include a thin coating of a noble metal such as gold, nickel or palladium.

* * * * *

UNITED STATES PATENT AND TRADEMARK OFFICE
CERTIFICATE OF CORRECTION

PATENT NO. : 4,982,130

DATED : January 1, 1991

INVENTOR(S) : Heinrich CAP, et al.

Page 1 of 2

It is certified that error appears in the above-identified patent and that said Letters Patent is hereby corrected as shown below:

On the title page, in "Foreign Patent Documents", for the "Austria" reference cited, change "0219553" to --0217553--.

Column 1, line 7, change Serial No. "051,138" to --053,138--.

Column 2, line 5, after "is", insert --further--.

Column 2, line 6, after "FIG. 1", insert --is--.

Column 2, line 26, change "communator" to --commutator--.

Column 2, line 63, change "helics" to --helices--.

Column 3, line 22, change "and/or" to --and--.

Column 3, line 31, after "adjustment", insert --and--.

Column 3, line 37, change "accoring" to --according--.

Column 3, line 38, after "segments", insert --,-- (comma).

Column 3, line 51, change "on" to --one--.

UNITED STATES PATENT AND TRADEMARK OFFICE
CERTIFICATE OF CORRECTION

PATENT NO. : 4,982,130

DATED : January 1, 1991

INVENTOR(S) : Heinrich CAP, et al.

It is certified that error appears in the above-identified patent and that said Letters Patent is hereby corrected as shown below:

Column 3, line 56, after and, insert --the--.

Column 4, line 34, change "electronic" to --electric--.

Signed and Sealed this

Thirtieth Day of June, 1992

*Attest:*

DOUGLAS B. COMER

*Attesting Officer*      *Acting Commissioner of Patents and Trademarks*